United States Patent
McCleskey

(10) Patent No.: US 10,473,802 B2
(45) Date of Patent: Nov. 12, 2019

(54) DOWNHOLE ENERGY CALIBRATION OF GAMMA RAY DETECTORS

(71) Applicant: BAKER HUGHES INCORPORATED, Houston, TX (US)

(72) Inventor: Matthew E. McCleskey, Anderson, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 0 days.

(21) Appl. No.: 15/591,768

(22) Filed: May 10, 2017

(65) Prior Publication Data

US 2018/0329090 A1 Nov. 15, 2018

(51) Int. Cl.

| | | |
|---|---|---|
| G01V 5/12 | (2006.01) |
| G01T 7/00 | (2006.01) |
| G01V 11/00 | (2006.01) |
| G01T 1/36 | (2006.01) |
| G01V 5/10 | (2006.01) |
| G01V 5/08 | (2006.01) |
| G01V 13/00 | (2006.01) |

(52) U.S. Cl.
CPC .............. *G01T 7/005* (2013.01); *G01T 1/36* (2013.01); *G01V 5/08* (2013.01); *G01V 5/10* (2013.01); *G01V 5/12* (2013.01); *G01V 11/002* (2013.01); *G01V 13/00* (2013.01)

(58) Field of Classification Search
CPC .................................................... G01T 7/005
See application file for complete search history.

(56) References Cited

U.S. PATENT DOCUMENTS

| | | | | |
|---|---|---|---|---|
| 6,275,645 | B1* | 8/2001 | Vereecken | G01N 33/24 250/254 |
| 2012/0098671 | A1* | 4/2012 | Wieczorek | G01T 1/2985 340/679 |
| 2015/0001383 | A1* | 1/2015 | Inanc | G01T 7/005 250/252.1 |

(Continued)

OTHER PUBLICATIONS

Ledingham, K. et al., "Applications for Nuclear Phenomena Generated by Ultra-Intense Lasers," Science 2003, 300 (5622), p. 1107.

(Continued)

*Primary Examiner* — Yara B Green
(74) *Attorney, Agent, or Firm* — Mossman, Kumar & Tyler, PC

(57) ABSTRACT

Estimating a parameter of interest, comprising intermittently generating a calibration radiation source in the carrier, the calibration radiation source comprising a radioisotope producing radiation to which the radiation sensor is exposed. Methods include measuring a calibration response from the radiation sensor with measurement circuitry during the exposure to produce calibration information, and measuring another response from the radiation sensor with the measurement circuitry to produce measurement information after the radioisotope has decayed to a reduced radiation level such that the measurement information is substantially unaffected by the radioisotope. The radioisotope may be a positron emitter producing radiation by annihilation of the positrons emitted from the radioisotope. The radiation produced may thus be gamma rays.

16 Claims, 5 Drawing Sheets

(56) References Cited

U.S. PATENT DOCUMENTS

2017/0018318 A1* 1/2017 Radel ...................... H05H 3/06

OTHER PUBLICATIONS

Ledingham, K. et al., "High power laser production of short-lived isotopes for positron emission tomography,"(J. Phys. D: Appl. Phys. 37 (2004) 2341-2345).

Angeli, E. et al., "Preliminary results on the production of short-lived radioisotopes with a Plasma Focus device," Applied Radiation and Isotopes 63 (2005), p. 545-551.

Roshan, M. et al., "Nuclear activation measurements of high energy deuterons d from a small plasma focus," Physics Letters A (2009), pp. 851-855.

* cited by examiner

DOWNHOLE ENERGY CALIBRATION OF GAMMA RAY DETECTORS

FIELD OF THE DISCLOSURE

In one aspect, this disclosure generally relates to methods, devices and systems for estimating at least one parameter of interest relating to a volume using nuclear radiation based measurements.

BACKGROUND OF THE DISCLOSURE

Using nuclear techniques to investigate volumes of either organic or inorganic matter is well known. For example, naturally radioactive elements are commonly found in earth formations in various proportions, depending on the type of lithology and other factors. Radioactive isotopes of potassium, uranium, and thorium are regularly occurring, naturally radioactive elements commonly quantified in the petroleum industry.

A rigid or non-rigid conveyance device is often used to convey one or more nuclear radiation detectors into a borehole intersecting the earth formation, often as part of a tool or a set of tools. There, the detector(s) may be used to estimate radiation associated with a volume of interest of the earth formation by generating a response to the one or more types of nuclear radiation detected. The response may be indicative of the nuclear radiation (e.g., gamma rays) present in the near-borehole environment during measurement. This response may then be used to estimate a parameter of interest of the volume. The detected nuclear radiation may be expressed as an energy spectrum (the "response spectrum"). "Response spectrum" refers to not only the response spectrum as originally acquired, but also after filtering, corrections, or pre-processing is applied.

Oil well logging has been known for many years and provides an oil and gas well driller with information about the particular earth formation being drilled. One or more parameters of interest of the earth formation obtained as above may relate to hydrocarbon exploration or production. For example, the parameter of interest may provide indications of the location and extent of hydrocarbons in a given earth formation.

SUMMARY OF THE DISCLOSURE

In aspects, the present disclosure is related to methods of evaluating a parameter of interest of a formation intersected by a borehole. Methods may employ a radiation sensor disposed on a carrier in the borehole. Methods may include intermittently generating a calibration radiation source in the carrier, the calibration radiation source comprising a radioisotope producing radiation to which the radiation sensor is exposed. The radioisotope may be a short-lived radioisotope.

Methods may include measuring a calibration response from the radiation sensor with measurement circuitry during the exposure to produce calibration information, and measuring another response from the radiation sensor with the measurement circuitry to produce measurement information after the radioisotope has decayed to a reduced radiation level such that the measurement information is substantially unaffected by the radioisotope. Embodiments may include intermittently generating the calibration radiation source in the carrier while measurement operations using the radiation sensor are suspended. The radioisotope may be a positron emitter producing radiation by annihilation of the positrons emitted from the radioisotope. The radiation produced may thus be gamma rays, such as gamma rays produced by the annihilation of positrons emitted from the radioisotope. The gamma rays produced by the annihilation of positrons emitted from the radioisotope may thus be used for calibration, including, in some instances, using a combined peak from simultaneously detected gamma rays as a calibration point. Detected radiation events may have an energy of between 500 keV and 1100 keV.

Methods may include conducting measurement operations in the borehole by processing a response from the radiation sensor with measurement circuitry before the exposure to produce measurement information; conducting calibration operations by processing a calibration response from the radiation sensor with the measurement circuitry during the exposure to produce calibration information; and conducting measurement operations by processing another response from the radiation sensor with the measurement circuitry after the exposure to produce calibrated measurement information in dependence upon the calibration information.

Embodiments may include using the calibrated measurement information to estimate the parameter of interest. The radiation sensor may be a spectral gamma ray detector. Generating the calibration radiation source may be carried out using at least one of: i) a pulsed laser; and ii) a plasma focus device. Particular embodiments may include generating the calibration radiation source within the sensor. Methods may include applying a current to a capacitor bank over a first time interval while making a measurement using a response from the radiation sensor; discharging the capacitor bank to a plasma focus device to generate the calibration radiation source; generating a calibration response using measurements from the radiation sensor while the radioisotope is within a window of calibration emissions sufficient for calibration; and allowing the radioisotope to decay to a reduced radiation level such that a radiation measurement is substantially unaffected by the radioisotope by ceasing activation of the plasma focus device and waiting for a second time interval before repeating the measurement cycle.

Other aspects of the present disclosure include apparatus for estimating a parameter of interest of a formation intersecting a borehole, comprising: a radiation sensor; a carrier configured to convey the radiation sensor into the borehole; and a source generator configured to intermittently generate a calibration radiation source in the carrier, the calibration radiation source comprising a radioisotope producing radiation to which the radiation sensor is exposed. The generator may be configured to operate in response to a command received from an operator.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
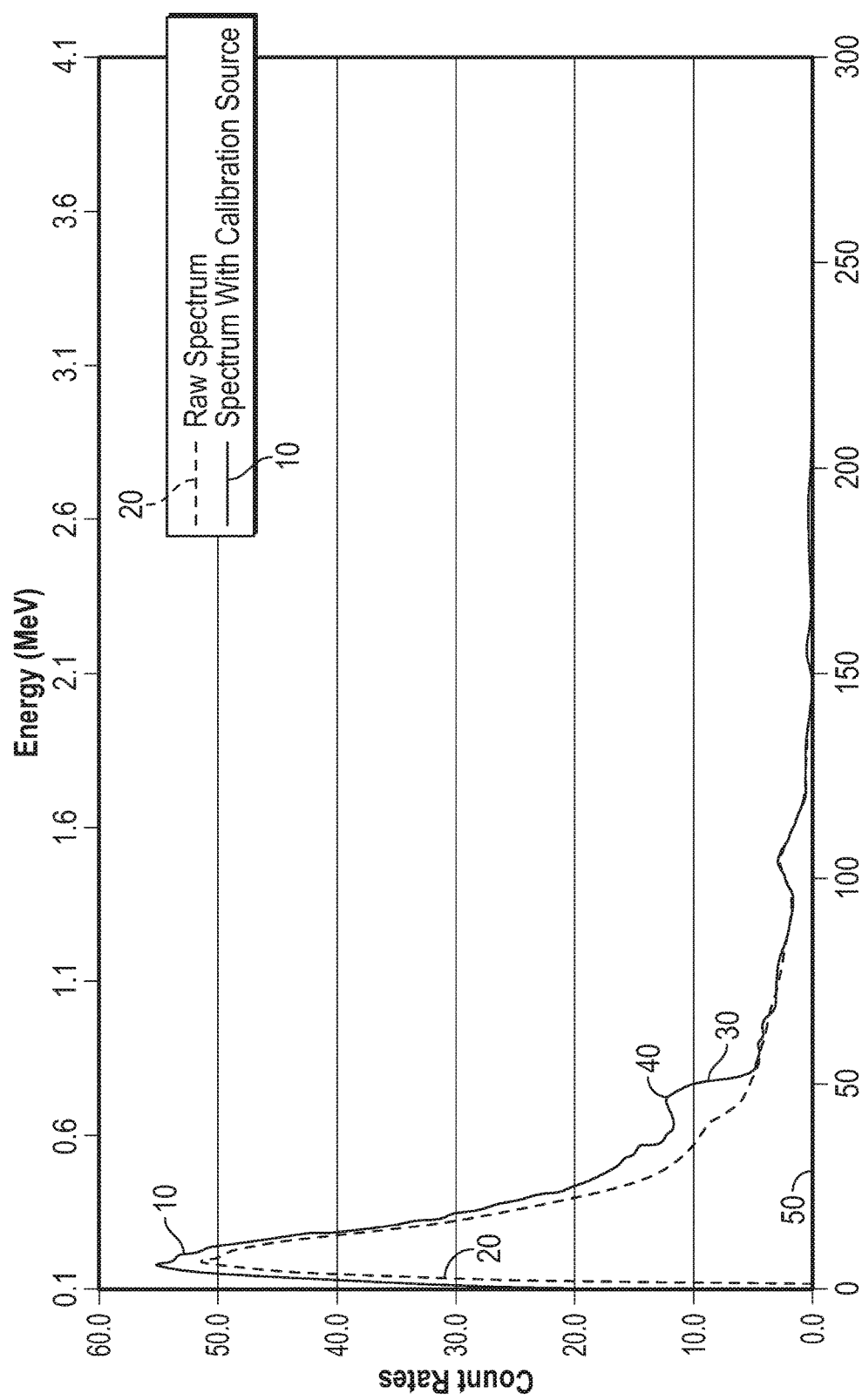
FIG. 1A illustrates a comparison of a gamma ray response spectrum corresponding to calibrated radiation information and another gamma ray response spectrum corresponding to calibrated radiation information polluted by exposure to a calibration source.

In aspects, this disclosure relates to detecting radiation from a volume, and particularly to calibrated radiation detection. Aspects of the present disclosure may relate to calibrating a radiation detector using a calibration radiation source, wherein the calibration minimizes effects on detected radiation information (e.g., an energy spectrum) resulting from exposure of the detector to the calibration radiation source. This may be carried out by calibrating a radiation detector using a calibration radiation source comprising a short-lived radioisotope generated in the carrier.

Method aspects may include intermittently generating a calibration radiation source in the carrier, and measuring a calibration response from the radiation sensor with measurement circuitry during the exposure to produce calibration information. The calibration radiation source may comprise a radioisotope producing radiation to which the radiation sensor is exposed. Methods may include measuring another response from the radiation sensor with the measurement circuitry to produce measurement information after the radioisotope has decayed to a reduced radiation level such that the measurement information is substantially unaffected by the radioisotope. The calibration radiation source in the carrier may be generated while measurement operations using the radiation sensor are suspended so as to avoid affecting measurement.

In some aspects, this disclosure relates to estimating a parameter of interest related to a volume from calibrated detected radiation, and may include estimating a parameter of interest of a formation intersected by a borehole using a radiation sensor disposed on a carrier in the borehole. The volume may be an earth formation, such as, for example, an earth formation surrounding a borehole. The parameter of interest may be a physical characteristic of the volume, such as, for example, elemental concentrations of naturally occurring radioactive material in a subterranean formation.

Illustrative methods of the present disclosure may include the acquisition and utilization of information characterizing calibrated detected radiation from one or more detectors. In many instances, the information used for these estimations may be acquired by tools deployed into a borehole intersecting one or more formations of interest. For context, an exemplary system for deploying and using such tools to acquire this information is described below with respect to FIGS. 3 & 4. Each of these aspects may be referred to generally as investigation of the formation.

The formation may be exposed to energy from another (non-calibration) radiation source. Downhole tools may include this other radiation source and one or more detectors. Herein, the other radiation source may include, but is not limited to, one or more of a neutron source, a gamma-ray source, and an x-ray source. The detectors may be used to detect radiation from the formation, though the detectors are not limited to detecting radiation of the same type as emitted by the other radiation source. Detectors may have shielding to prevent the counting of radiation from unintended sources. Shielding of the detectors may be implemented for neutrons and gamma rays. Gamma ray shielding prevents the detection of gamma rays from behind the tool and from that originating within the tool. Neutron shielding prevents neutrons from reaching the detector regions and inducing gamma rays. Combinations of neutron moderators, neutron absorbers, high hydrogen content epoxies, and high-density high-Z materials are known to those of skill in the art.

In one common application of downhole radiation detection, the energy spectrum caused by radioactive decay of radionuclides may be used to estimate parameters of interest of an earth formation. The energy spectrum may be expressed in terms of magnitude (e.g., gamma ray counts per period of time) as a function of energy. The radioactive decay of radionuclides within the formation may produce nuclear radiation that may be detected by radiation detectors. These radionuclides may include naturally occurring radionuclides (such as potassium-40, and the uranium and thorium series), which exist in the earth formation, and activated radionuclides, which may include radionuclides activated from the irradiation of nuclides in the formation with nuclear radiation.

One or more of the detectors may include a scintillator component comprising a radiation responsive element (for example, a scintillator crystal or the like) which produces light scintillations in response to absorbing radiation (e.g., neutrons, gamma rays, etc.), and at least one light responsive device (e.g., a photomultiplier tube, other photomultiplier device, charge coupled silicon device, and so on) configured to produce an output representative of the respective light scintillations.

For the practical application of radiation information, continued calibration is desirable for precise detection and characterization of the radiation. Traditionally, calibration of the detector is carried out using a chemical calibration radiation source, or associated with the tool (and having known characteristics) as a reference. Use of the detector in such applications may involve calibrating the detector such that radiation information from detection of the source is consistent with information expected from the known characteristics. The chemical source provides constant radiation for continual calibration as desired.

In one example of such a practical application, a scintillator as described above may be employed in spectral gamma ray logging to estimate elemental concentrations of potassium-40, and the uranium and thorium series (collectively, 'KUTh concentrations') in a volume. Because these elements emit gamma radiation at specific characteristic energies, components of radiation from each of the elements contributing to the total gamma ray spectrum may be determined by identifying the characteristic energies from a response spectrum using known methods of decomposition. Other naturally radioactive or activated elements may also be similarly identified. The elemental concentrations may then be subjected to various forms of processing and analysis to predict the location and extent of hydrocarbons in the formation.

For spectral gamma ray logging, precise measurement of the energy corresponding to each gamma ray is desirable. Due to changes in temperature and other environmental variations in the borehole, both scintillator output and the gain of the photomultiplier may shift over time. Environmental variations may be drastic for some applications. Left unaddressed, these gain changes may skew the response spectrum. It is therefore common in some gamma ray logging systems to include gain control electronics for offsetting this gain change to maintain precise results. A chemical calibration radiation source as described above is often used in conjunction with gain control electronics. Cesium-137 and Americium-241 are typical sources. The chemical calibration radiation source generates one or more calibration peaks in the gamma ray spectrum at known energies (see calibration peak 40 at 0.662 MeV corresponding to Cs-137 exposure; FIG. 1A). Discrepancies between the known energy of the peak(s) and the response spectrum may be used to correct the gain and calibrate the device. Due to the continual change of conditions, continual calibration of the device is desired during measurement in the borehole.

However, continuous exposure to the calibration radiation source is problematic. For example, calibration with gamma sources such as Cesium-137 may be undesirable for natural gamma measurements due to the low count rates from the formation often being measured and the interference of the calibration peak from the seed source with the measured spectrum from the formation. Calibration radiation sources of sufficient strength may provide accurate calibration, but may contaminate the radiation information, especially at lower energies, as shown in FIG. 1A.

FIG. 1A illustrates a comparison of a gamma ray response spectrum 20 corresponding to "clean" calibrated radiation information and another gamma ray response spectrum 30 corresponding to calibrated radiation information polluted by exposure to a chemical Cesium-137 calibration source. The range of response energies are assigned to energy channels 50. When the radiation information is calibrated, the gain is adjusted to a gain such that specific energies fall within (e.g., correspond to) particular channels, known as standard gain (i.e., reference conditions). As can been seen, the total gamma ray energy in the 0.0-1.0 MeV range of gamma ray response spectrum 30 is greater than in gamma ray response spectrum 20, due to inaccuracies in the response spectrum introduced by the exposure. Because the low energy segment of the spectrum is used to compute the total gamma ray, it is desirable to eliminate low energy gamma ray pollution from detected gamma ray information.

Use of a weaker source (or elimination of the source altogether) is not practical, as it often results in misidentification of peaks. For example, on typical instrumentation settings, Americium-241 occupies a low channel away from the energy region of interest, making precise calibration difficult and introducing the possibility of statistically significant errors in calibration. Elimination of the calibration source altogether further increases statistical error. This problem is especially relevant in logging while drilling ('LWD') applications, as the thickness of the metallic drill collar results in relatively low counts that exacerbate the decrease in accuracy. Other approaches have been attempted, but result in less than optimal results. For example, attempts have suffered from loss of accuracy due to non-linearity effects, failure in large gain shifts, and failure in conditions producing low count rates.

Further, in the field of spectral gamma ray logging, it would be desirable to restore the obtained spectra to a reference condition before any processing is done to ensure accurate spectral decompositions. It would also be desirable to enable the use of a calibration radiation source in connection with spectral gamma ray logging to bring the raw spectra back to reference conditions (i.e., where distortions from gain changes resulting from changes in borehole conditions are mitigated) while minimizing pollution of the radiation data.

General embodiments in accordance with the invention may include systems, devices, and methods for calibrated radiation detection with reduced pollution of radiation information. Embodiments include intermittently generating a calibration radiation source in the carrier comprising a radioisotope producing radiation to which the radiation sensor may be exposed. The radiation may be produced directly or indirectly. Techniques described herein include measuring a calibration response from the radiation sensor with measurement circuitry during the exposure to produce calibration information.

After the radioisotope has decayed to a reduced radiation level such that the measurement information is substantially unaffected by the radioisotope, another response from the radiation sensor is measured using the measurement circuitry to produce measurement information. In embodiments, the radioisotope is a short-lived radioisotope. The calibration radiation source may be generated in the carrier while measurement operations using the radiation sensor are suspended. Other embodiments may include performing a mitigation process on a portion of response information relating to exposure of the radiation sensor to a calibration radiation source during measurement operations.

Optimal methods for calibrating a spectral gamma ray detector would introduce a source with one or more peaks in the relevant energy region, make the calibration, then remove the source for making a measurement. Furthermore, this calibration procedure should be repeated periodically, particularly when the temperature (and thus the gain) changes. Unfortunately, removal physical removal of the source downhole, where temperature changes take place, has proven challenging. Aspects of the present disclosure produce a short-lived radioisotope inside the tool, perform the calibration and then allow the radioisotope to decay away to a level that will not interfere with the measurement.

Figure 1B:
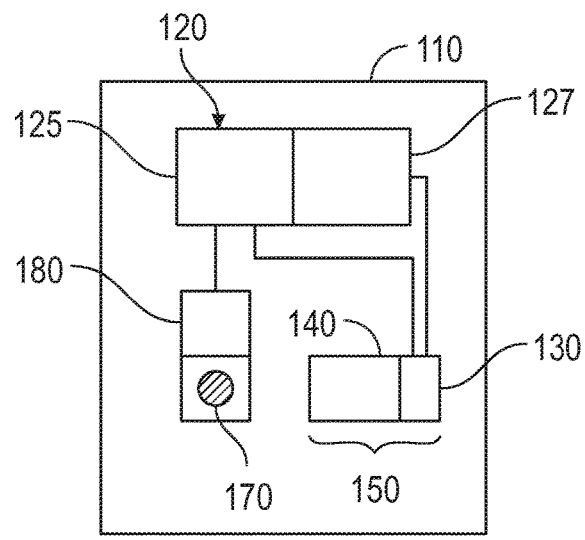
FIG. 1B illustrates device in accordance with embodiments of the present disclosure.

FIG. 1B illustrates a device 110 having a sensor (scintillator) 150 in accordance with embodiments of the present disclosure. The sensor 150 includes a light responsive device 130 and at least one radiation responsive element 140. The radiation responsive element 140 may comprise a scintillation crystal such as NaI, CsI, BGO; glass doped with isotopes of one or more of lithium (e.g., Li-6, Li-7), cerium, europium, praseodymium, and terbium; or other suitable material. The light responsive device 130 (e.g., photomultiplier tube) is optically coupled to the radiation responsive element 140 at one end, such that light scintillations occurring in the element are converted to electrical signals. Processing circuitry 120 receives output (e.g., voltage) from the light responsive device 130 indicative of luminescent activity of the element 140. The processing circuitry 120 processes the output to produce radiation information indicative of the output. The processing circuitry 120 records the radiation information and/or transmits the radiation information to the surface. This process of acquiring radiation information using the sensor 150 and processing circuitry 120 may be referred to generally as measurement.

The dimensions of the element 140 or other characteristics of sensor 150 may be specifically configured to increase or reduce detection of specific types of radiation (e.g., gamma rays, thermal neutrons, fast neutrons, etc.). Element 140 may be solid or hollow, and may be formed to any shape. In further embodiments, element 140 may comprise an aggregate of a plurality of rods, sheets, beads, or other shapes comprised of one or more radiation responsive materials, a radiation responsive powdered material, and so on. Device 110 may further include shielding to increase effectiveness of the sensor 150 as known in the art.

In addition to measurement, a second characteristic function of device 110 is calibration, which generally refers to adjustment of the measurement process described above using reference radiation from a calibration radiation source 170. Calibration radiation source 170 may have at least one known characteristic energy peak. In some embodiments, the calibration radiation source 170 comprises positron emitters. As the positron emitters decay, 511 keV annihilation gamma rays are produced that can then be used to calibrate the gamma ray detectors. Since the produced source is short lived, radiation at the detector will be minimally increased from ambient radiation within a few minutes after generation is ceased. Calibration in the context of device 110 may occur during a calibration period. The calibration period refers to the period of exposure of sensor 150 to the calibration radiation source, while the calibration radiation source produces sufficient radiation for calibration.

Processing circuitry 120 may include a variable gain amplifier 127 or other similar circuitry. Processing circuitry 120 may also include control circuitry 125 for enabling the operation of one or more systems, sub-systems, or functions of device 110, either autonomously or in coordination with operator instructions. Processing circuitry 120 may include at least one processor, and at least one computer readable medium accessible to the processor(s) having instructions disposed thereon that when executed by the processor cause the processor to carry out methods of the present disclosure.

During the calibration period, calibration information may be obtained. Calibration information may be applied advantageously for at least one of adjusting the data signal and adjusting controls or response of the device (e.g., sensor or processing circuitry). During the calibration period, the control circuitry 125 may adjust the variable gain amplifier to carry out calibration as described above to reduce gain-based distortions resulting from changes in borehole conditions. The control circuitry 125 may alternatively acquire calibration information during the calibration period, and adjust the control circuitry or radiation information during a later period. The control circuitry may be configured to adjust the variable gain amplifier or the like to reconcile differences between the known characteristic energy peak of the calibration radiation source 170 and a measured peak on the response spectrum identified as the corresponding measured peak, according to known calibration processes. This process may be iterative and/or employ negative feedback.

In addition to calibration radiation source 170, device 110 further includes a calibration source generator 180 associated therewith. Calibration source generator 180 is configured to selectably generate the calibration radiation source, so as to cause brief intermittent exposure of the radiation sensor 150 to the calibration radiation source 170 while the device is in the borehole. In operation, control circuitry 125 allows extended periods of measurement by sensor 150 without exposure of sensor 150 to the calibration radiation source 170 and also intermittently provides calibration periods. Control circuitry 125 may include at least one processor, and at least one computer readable medium accessible to the processor(s) having instructions disposed thereon that when executed by the processor cause the source generator 180 to generate the calibration radiation source while the device is in the borehole.

A possible type of radioisotope for such an approach would be a short-lived positron ($\beta$+) emitter. Upon decay of the source, the positron released almost instantly combines with an electron in the target or surrounding material to annihilate and produce two 511 keV gamma rays 180 degrees apart. If the target where the positron emitter is produced is close to the detector, the efficiency of detection is quite high, meaning a good calibration spectrum may be obtained with fewer decays. Further, the energy of the resulting gamma rays (511 keV) is near the energy region of interest for natural gamma measurements. If the count rate is high, it may also be possible to use the 1.022 MeV sum peak as a second calibration point from simultaneous detections.

Various positron emitters may be employed, and the particular emitter ('source') may be selected for use based on a particular combination of advantages and disadvantages with respect to a particular application taking into account characteristics including production rate, decay time, ease of generation, and other factors as will occur to those of skill in the art. One possible positron emitter for use in accordance with embodiments of the present disclosure is Oxygen-15, produced through $^{14}N(d,n)^{15}O$. This isotope has a short half-life and, consequentially, high specific activity. A list of isotopes is given in Table 1.

| Isotope | Half-Life | b+ Endpoint Energy MeV (% b+) | Mean range in water (mm) | Theoretical Specific Activity (Ci/nmole) |
| --- | --- | --- | --- | --- |
| C-11 | 20.4 min | 0.96 (100%) | 1.13 | 9.2 |
| N-13 | 10 min | 1.2 (100%) | 1.60 | 18.8 |
| F-18 | 110 min | 0.6 (97%) | 0.59 | 1.7 |
| O-15 | 2 min | 1.73 (100%) | 2.75 | 94.0 |
| Fe-52 | 8.3 hrs | 0.8 (55%) | 0.94 | 0.38 |
| I-124 | 4.3 days | 2.13 (11%) | | |

In aspects of the disclosure generator 180 may thus be implemented using a compact system for production of short-lived positron emitters similar to those used, for example, in positron emission tomography ('PET'). PET techniques pertaining to production of short-lived positron emitting isotopes $^{11}C$, $^{13}N$, $^{15}O$ and $^{18}F$ by proton irradiation of natural and/or enriched targets are well known. Small footprint systems include those using high powered pulse lasers and/or plasma focus devices. A plasma focus device generates, accelerates, and pinches a plasma, in a pulsed mode with a particular repetition frequency. Production of $^{14}N(d,n)^{15}O$ may be accomplished, for example, using TiN as a possible target, although other targets may also be appropriate as will occur to those of skill in the art.

Recent advances in technology have led to the development of compact multi-terawatt to petawatt pulsed laser systems. When highly focused, the intensity may reach the order of $10^{20}$ Watts per square centimeter. When an intense laser beam interacts with a solid target, beams of protons capable of producing PET isotopes may be generated. The mechanisms involved in the laser-based acceleration of protons are quite complex, and not completely resolved. However, under one theory, interaction of a laser pulse with a target surface produces hot energetic electrons and ions. The electrons may traverse the target and ionize atoms (e.g., hydrogen) on the opposite surface of the target. This creates sheets of opposing polarity (positive ion and negative electron) which generate electric fields sufficient to accelerate protons to several MeV. See, for example, K. Ledingham et al. 2003 Science, Vol. 300, p. 1107.

The paper "High power laser production of short-lived isotopes for positron emission tomography," by Ledingham et al. (*J. Phys. D: Appl. Phys.* 37 (2004) 2341-2345) describes generating PET sources using a petawatt laser beam. The introduction of chirped pulse amplification has led to the development of multi-terawatt pulsed laser systems. A laser pulse on the order of femtoseconds or picoseconds may be stretched using dispersive gratings, and then recompressed after amplification to deliver the requisite power. As the laser intensity and associated electric field are increased, the electron quiver energy increases dramatically. Id. The quiver energy is the energy that a free electron has in the laser field. When laser radiation is focused on solid targets at the intensities described, electrons quiver with energies greater than their rest mass (i.e., 0.511 MeV), thereby creating relativistic plasmas. The laser used in the experiments of the paper was the VULCAN Nd: Glass laser at the Rutherford Appleton Laboratory.

The 60 centimeter beam was focused on to a 5.5 micron diameter spot using a 1.8 meter focal length off-axis parabolic mirror in a vacuum chamber. The average pulse duration was 750 femtoseconds and the reported energy on target was between 220 and 300 Joules. The peak intensity was of the order of $10^{20}$ Watts per square centimeter. Aluminum, gold, and mylar foil targets of various thicknesses were irradiated at an angle of 45 degrees, producing protons from water and hydrocarbon contamination layers on the target surfaces. Copper and boron positioned along the target normal direction were exposed to the protons accelerated from both the front and back surfaces of the target foil. The activity in the foils from the $^{63}Cu(p,n)^{63}Zn$ with a half-life of 38 minutes was measurable by an NaI detector. Also detected was $^{11}C$ activity produced by a (p,n) reaction on $^{11}B$.

More recently, the possibilities production of short-lived radioisotopes within pulsed discharges of a plasma focus device ("endogenous production") have been investigated. These techniques rely on nuclear reactions for the creation of radioisotopes directly within the plasma. See, for example, E. Angeli et al. Preliminary results on the production of short-lived radioisotopes with a Plasma Focus device. Applied Radiation and Isotopes 63 (2005), p. 545-551. These techniques may be readily adapted to use in a downhole tool.

Figure 2:
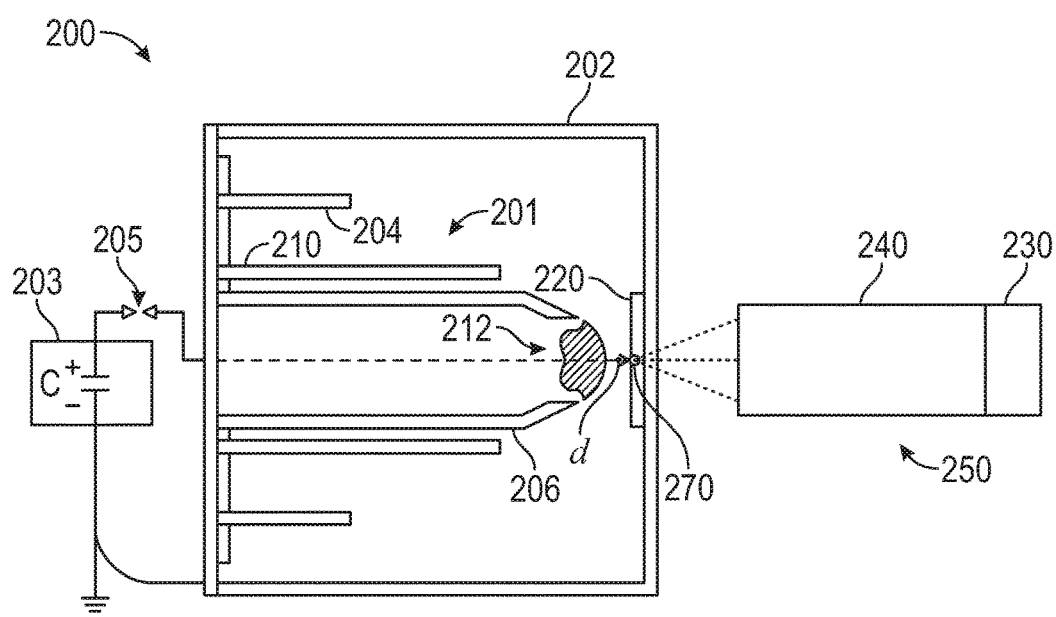
FIG. 2 illustrates a generator in accordance with embodiments of the present disclosure.

FIG. 2 illustrates a plasma focus device in accordance with embodiments of the present disclosure. The device 200 may comprise an electrode assembly 201 including coaxial cylindrical electrodes 204, 206. The electrodes may include a hollow tapered copper anode 206. The cathode 204 may comprise a tubular section or a "squirrel cage" formed from wire or rod segments. The cylindrical electrodes are closed and electrically insulated at one end and open at the other. A target 220 is placed along a longitudinal axis of the cylindrical electrodes past the open end and opposite the closed end. In one example, a Pyrex insulator sleeve 210 may be used. The electrode assembly may be enclosed by a vacuum chamber 202. The vacuum chamber 202 may contain a mixture of gases of a low atomic number. Various pressures may be used according to particular application. In one instance, the pressure may be low (e.g., 2 to 10 Torr).

The device utilizes a capacitor bank 203 that is very quickly discharged onto the coaxial group of electrodes to produce a pulse. The discharge is compact and the capacitor bank could be charged over time when power is available then discharged when a calibration is desirable. The energy may be released through a fast spark-gap switch 205 to the electrodes 204, 206 in a time that may be on the order of microseconds.

Thus, method embodiments may include applying a current to a capacitor bank over a first time interval while making a measurement using a response from the radiation sensor; discharging the capacitor bank to a plasma focus device to generate the calibration radiation source; generating a calibration response using measurements from the radiation sensor while the radioisotope is within a window of calibration emissions sufficient for calibration; and allowing the radio isotope to decay to a reduced radiation level such that a radiation measurement is substantially unaffected by the radioisotope by ceasing activation of the plasma focus device and waiting for a second time interval before repeating the measurement cycle.

The voltage (e.g., tens of kV) impressed between the electrodes produces an electrical discharge in which a sheath of plasma evolves axially along the electrode assembly until it collapses at the open end. At the time of maximum compression (i.e., the pinch phase), a hot and dense magnetized plasma column is formed. The pinch 212 has a duration of a few tens of nanoseconds. Although the charges involved are only on the order of a Coulomb, the charges are released in microseconds, so that peak currents flowing through the plasma can be on the order of millions of amperes. See Angeli. As in the laser-induced acceleration discussed above, the ion acceleration mechanism within the plasma focus pinch column is unsettled.

Referring again to Angeli, deuterium-deuterium (D-D) or deuterium-tritium (D-T) fusion reactions occur, resulting in an emission of neutrons and ions within the pinch of the collapsed plasma. This process may be approximated as an instantaneous, isotropic point source of monoenergetic neutrons, emitted with an energy of 2.45 MeV for D-D reactions and 14.1 MeV for D-T reactions. If the reactants involved are captured within plasmoids formed within the pinch volume, the density and temperature conditions inside these regions produce high nuclear reaction rates.

Nuclear activation of a low-Z target material by energetic deuterons d may be a suitable generation mechanism for the positron emitter 270. See M. Roshan et al. Nuclear activation measurements of high energy deuterons d from a small plasma focus. Physics Letters A (2009), pp. 851-855 (describing activation of a boron carbide target resulting in positron emitters $^{11}C$ and $^{13}N$). Production of the emitter 270 may be accomplished, for example, using TiN as a possible target. In its ceramic form, TiN may be resistant to the high intensity plasma of the plasma focus device. Positrons are annihilated substantially immediately, resulting in radiation detected at detector 250. As the target is advantageously located within the tool, the radiation produced may be detected with high efficiency by the detector. In particular embodiments, the target may be positioned within the sensor proximate the scintillation material. In one example, the target may be within the scintillation material, such as, for example, within a hollow cylinder of fibers or joined fiber material made up of crystalline scintillation materials, amorphous glass, nanostructured glass ceramics, and the like. The radiation may predominantly comprise gamma rays of a known energy corresponding to positron annihilation. Detector 250 comprises radiation responsive element (e.g., scintillator) 240 and light responsive device 230, as will occur to those of skill in the art.

One advantage of this generated calibration radiation source is that a short time after generation, the radiation produced declines to a degree that the measurements taken at the detector 250 are substantially unaffected. This allows short periods of calibration while measurements for the purpose of downhole investigation and evaluation are suspended. In this way, the measurements for investigation and evaluation are unpolluted by the calibration energy. Suspension of measurement to allow calibration may be most practical during periods when movement of the sensor proceeds at a rate lower than the nominal operating rate, and may be carried out during a period of time in which the radiation sensor is stationary relative to the formation. That is, little to no features/area of the borehole would be measured in the case that measurements had continued than would have already been measured.

Alternatively, intermittent periods of exposure during measurement may be accounted for using a mitigation process. Generation and exposure to the calibration source may be carried out with device 110, as described above. Exposure may occur during specific periods such as, for example, during a period when the sensor is substantially still with respect to the borehole, or exposure may occur at other intervals. The calibration period may overlap with measurement, up to and including the entire calibration period. Periods of exposure may coincide with times that no data of interest is being recorded. For example, when the device is stationary with respect to the borehole, data recorded may be redundant data. Redundant data overlapping with calibration may then be simply discarded.

Each of the embodiments herein may be used in a variety of settings in both drilling and non-drilling environments. In some implementations, the disclosed embodiments may be used in connection with LWD or MWD tools as part of a drilling system, while in other implementations embodiments may be incorporated into other types of well tools, such as wireline or slickline systems.

Figure 3:
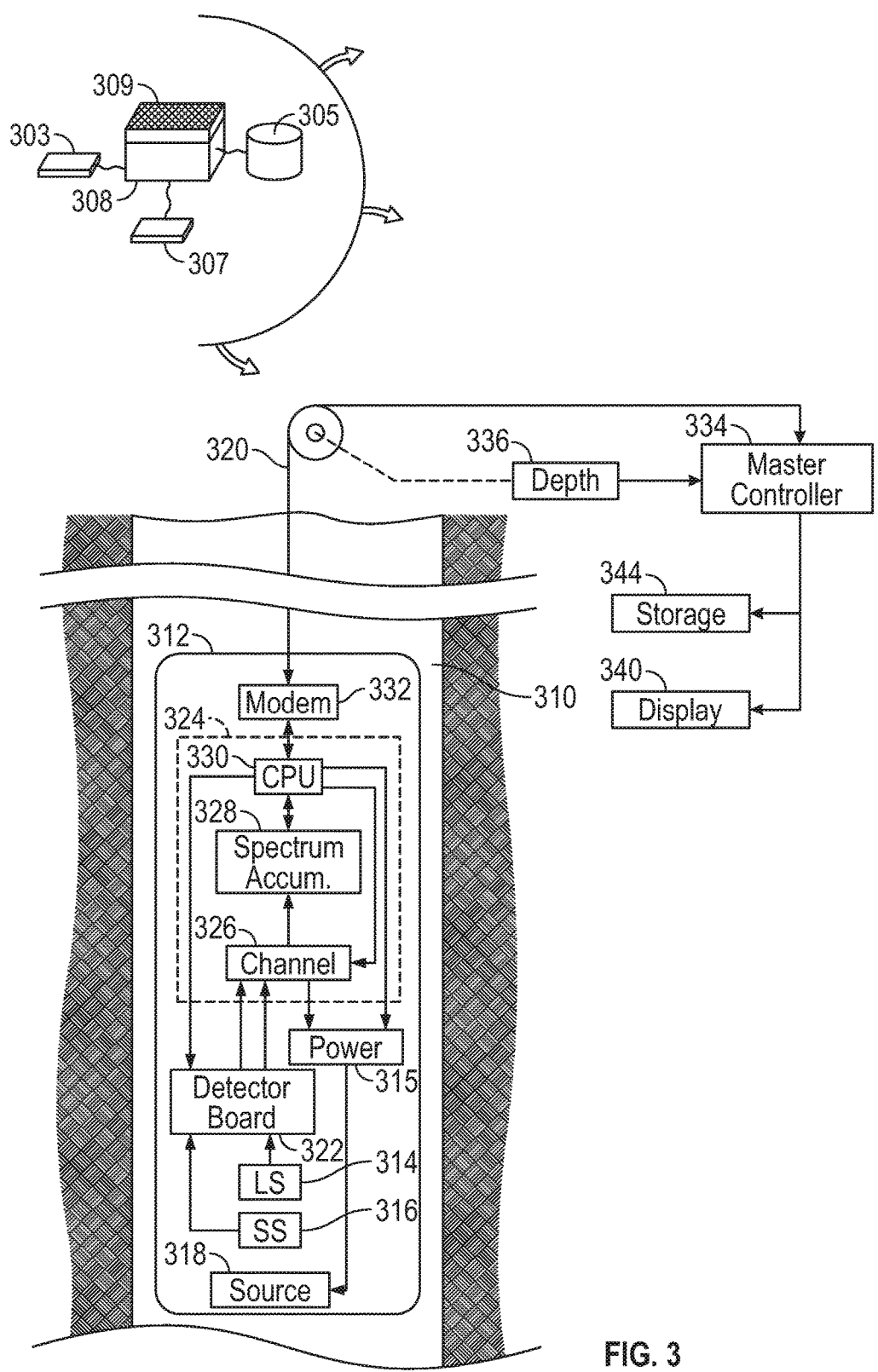
FIG. 3 illustrates a nuclear well logging configuration in accordance with embodiments of the present disclosure.

Referring now to the drawings in more detail, and particularly to FIG. 3, there is illustrated a nuclear well logging configuration in accordance with the present invention. Well 310 penetrates the earth's surface and may or may not be cased depending upon the particular well being investigated. Disposed within well 310 is subsurface well logging instrument 312. The system diagramed in FIG. 1 is a microprocessor-based nuclear well logging system using multi-channel scale analysis for determining the timing distributions of the detected gamma rays. Well logging instrument 312 includes long-spaced (LS) detector 314, short-spaced (SS) detector 316 and pulsed neutron source 318. In an exemplary embodiment, LS and SS detectors 314 and 316 are comprised of a scintillator, such as, for example, NaI, or bismuth-germanate (BGO) or fiber materials (including joined fiber) comprising crystalline scintillation materials such as LuAG and YAG, amorphous glass, glass ceramics and the like, coupled to photomultiplier tubes. To protect the detector systems from the high temperatures encountered in boreholes, the detector system may be mounted in a Dewar-type flask. Also, in an exemplary embodiment, source 318 comprises a pulsed neutron source using a D-T reaction wherein deuterium ions are accelerated into a tritium target, thereby generating neutrons having an energy of approximately 14 MeV. The filament current and accelerator voltage are supplied to source 318 through power supply 315. Cable 320 suspends instrument 312 in well 310 and contains the required conductors for electrically connecting instrument 12 with the surface apparatus.

The outputs from LS and SS detectors 314 and 316 are coupled to detector board 322, which amplifies these outputs and compares them to an adjustable discriminator level for passage to analog-to-digital converter ('ADC') 326. ADC 326 converts the output pulse heights to digital values, which are accumulated into pulse height spectra, in which the pulses are sorted according to their amplitudes into a discrete array of bins. The bins uniformly divide the entire amplitude range. These pulse height spectra are accumulated in registers in the spectrum accumulator 328, the spectra being sorted according to their type: inelastic, capture, or background. After a pulse height spectrum has been accumulated, CPU 330 controls the transfer of the accumulated data to the modem 332, which is coupled to cable 320 for transmission of the data over a communication link to the surface apparatus. To be explained later are further functions of CPU 330 in communicating control commands which define certain operational parameters of instrument 312 including the discriminator levels of detector board 322, and the filament current and accelerator voltage supplied to source 318 by power supply 315.

The surface apparatus includes master controller 334 coupled to cable 320 for recovery of data from instrument 312 and for transmitting command signals to instrument 312. There is also associated with the surface apparatus depth controller 336 which provides signals to master controller 334 indicating the movement of instrument 312 within well 310. An input terminal may be coupled to master controller or processor 334 to allow the system operator to provide selected input into master controller 334 for the logging operation to be performed by the system. Display unit 340, and storage unit 344 coupled to the master controller 334 may be provided. The data may also be sent by a link to a remote location. Processing may be done either by the surface processor, at the remote site, or by a downhole processor.

Master controller 334 initially transmits system operation programs and command signals to be implemented by CPU 330, such programs and signals being related to the particular well logging operation. Instrument 312 is then caused to traverse well 310 in a conventional manner, with source 318 being pulsed in response to synchronization signals from channel generator 326. This, in turn, causes a burst of high-energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 314 and 316. As each gamma ray thus impinges upon the crystal-photomultiplier tube arrangement of the detectors, a voltage pulse having an amplitude functionally related to the energy of the particular gamma ray is delivered to detector board 322. It will be recalled that detector board 322 amplifies each pulse and compares them to an adjustable discriminator level, typically set at a value corresponding to approximately 100 keV. If such pulse has an amplitude corresponding to an energy of at least approximately 100 keV, the voltage pulse is transformed into a digital signal and passed to channel generator 326 of MCS section 324.

Figure 4:
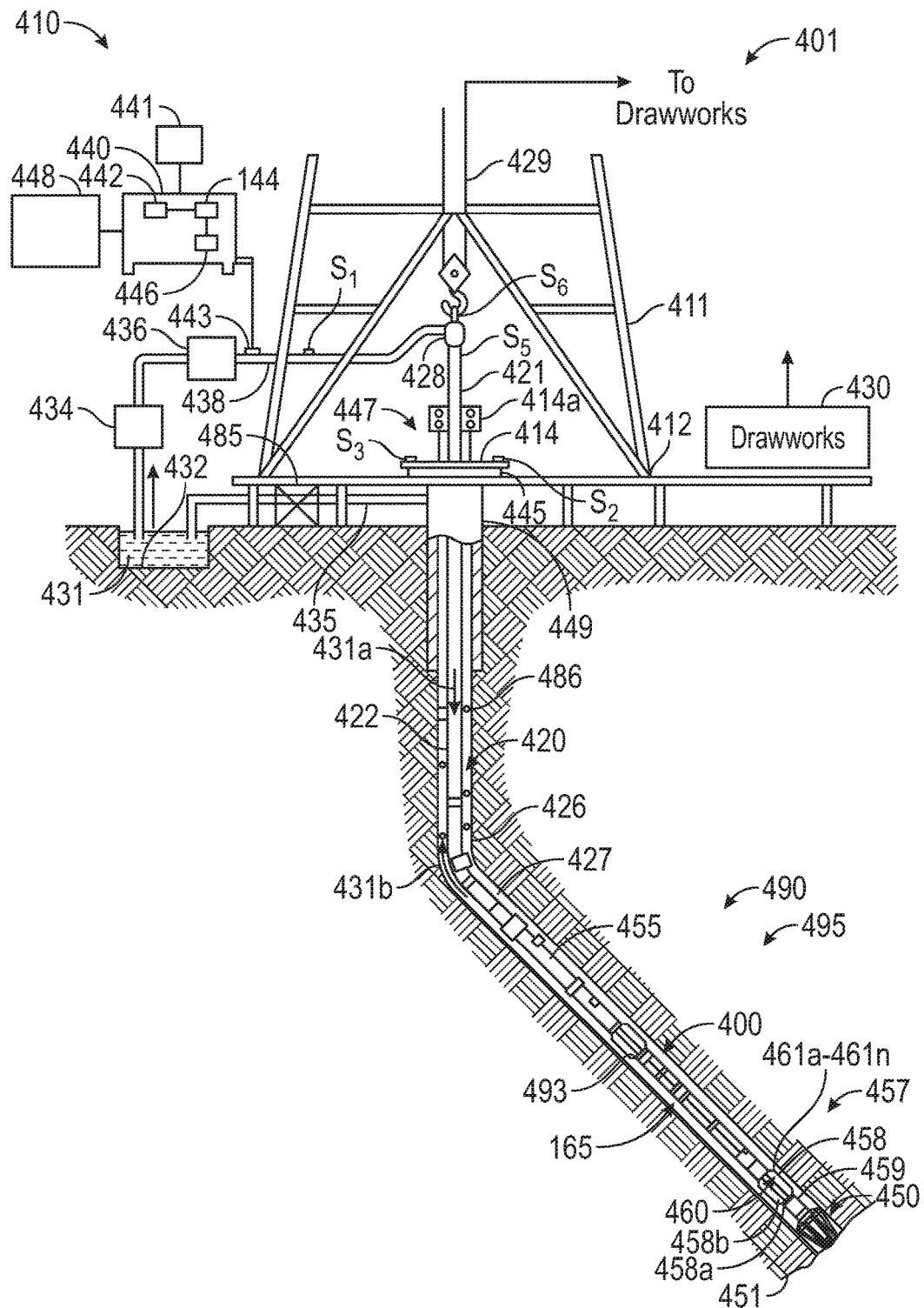
FIG. 4 is a schematic diagram of an exemplary drilling system that includes a drill string having a drilling assembly attached to its bottom end that includes a steering unit according to one embodiment of the disclosure.

FIG. 4 is a schematic diagram of an exemplary drilling system 401 that includes a drill string having a drilling assembly attached to its bottom end that includes a steering unit according to one embodiment of the disclosure. FIG. 4 shows a drill string 420 that includes a drilling assembly or bottomhole assembly (BHA) 490 conveyed in a borehole 426. The drilling system 100 includes a conventional derrick 411 erected on a platform or floor 412 which supports a rotary table 414 that is rotated by a prime mover, such as an electric motor (not shown), at a desired rotational speed. A tubing (such as jointed drill pipe 422), having the drilling assembly 490, attached at its bottom end extends from the surface to the bottom 451 of the borehole 426. A drill bit 450, attached to drilling assembly 490, disintegrates the geological formations when it is rotated to drill the borehole 426. The drill string 420 is coupled to a drawworks 430 via a Kelly joint 421, swivel 428 and line 429 through a pulley. Drawworks 430 is operated to control the weight on bit ("WOB"). The drill string 420 may be rotated by a top drive (not shown) instead of by the prime mover and the rotary table 414. Alternatively, a coiled-tubing may be used as the tubing 422. A tubing injector 414a may be used to convey the coiled-tubing having the drilling assembly attached to its bottom end. The operations of the drawworks 430 and the tubing injector 414a are known in the art and are thus not described in detail herein.

A suitable drilling fluid 431 (also referred to as the "mud") from a source 432 thereof, such as a mud pit, is circulated under pressure through the drill string 420 by a mud pump 434. The drilling fluid 431 passes from the mud pump 434 into the drill string 420 via a desurger 436 and the fluid line 438. The drilling fluid 431a from the drilling tubular discharges at the borehole bottom 451 through openings in the drill bit 450. The returning drilling fluid 431b circulates uphole through the annular space 427 between the drill string 420 and the borehole 426 and returns to the mud pit 432 via a return line 435 and drill cutting screen 485 that removes the drill cuttings 486 from the returning drilling fluid 431b. A sensor S1 in line 438 provides information about the fluid flow rate. A surface torque sensor S2 and a sensor S3 associated with the drill string 420 respectively provide information about the torque and the rotational speed of the drill string 420. Tubing injection speed is determined from the sensor S5, while the sensor S6 provides the hook load of the drill string 420.

In some applications, the drill bit 450 is rotated by only rotating the drill pipe 422. However, in many other applications, a downhole motor 455 (mud motor) disposed in the drilling assembly 490 also rotates the drill bit 450. The rate of penetration (ROP) for a given BHA largely depends on the WOB or the thrust force on the drill bit 450 and its rotational speed.

The mud motor 455 is coupled to the drill bit 450 via a drive shaft disposed in a bearing assembly 457. The mud motor 455 rotates the drill bit 450 when the drilling fluid 431 passes through the mud motor 455 under pressure. The bearing assembly 457, in one aspect, supports the radial and axial forces of the drill bit 450, the down-thrust of the mud motor 455 and the reactive upward loading from the applied weight-on-bit.

A surface control unit or controller 440 receives signals from the downhole sensors and devices via a sensor 443 placed in the fluid line 438 and signals from sensors S1-S6 and other sensors used in the system 400 and processes such signals according to programmed instructions provided to the surface control unit 440. The surface control unit 440 displays desired drilling parameters and other information on a display/monitor 441 that is utilized by an operator to control the drilling operations. The surface control unit 440 may be a computer-based unit that may include a processor 442 (such as a microprocessor), a storage device 444, such as a solid-state memory, tape or hard disc, and one or more computer programs 446 in the storage device 444 that are accessible to the processor 442 for executing instructions contained in such programs. The surface control unit 440 may further communicate with a remote control unit 448. The surface control unit 440 may process data relating to the drilling operations, data from the sensors and devices on the surface, data received from downhole, and may control one or more operations of the downhole and surface devices. The data may be transmitted in analog or digital form.

The BHA 490 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 495 surrounding the BHA 490. Such sensors are generally known in the art and for convenience are generally denoted herein by numeral 465. The BHA 490 may further include a variety of other sensors and devices 459 for determining one or more properties of the BHA 490 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 459.

The BHA 490 may include a steering apparatus or tool 458 for steering the drill bit 450 along a desired drilling path. In one aspect, the steering apparatus may include a steering unit 460, having a number of force application members 461a-461n, wherein the steering unit is at partially integrated into the drilling motor. In another embodiment the steering apparatus may include a steering unit 458 having a bent sub and a first steering device 458a to orient the bent sub in the wellbore and the second steering device 458b to maintain the bent sub along a selected drilling direction.

The drilling system 400 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 400 can include one or more downhole processors at a suitable location such as 493 on the BHA 490. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 442 can process the surface measured data, along with the data transmitted from the downhole processor, to evaluate formation lithology. While a drill string 420 is shown as a conveyance system for sensors 465, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 400 may include a bottomhole assembly and/or sensors and equipment for implementation of embodiments of the present disclosure on either a drill string or a wireline. A point of novelty of the system illustrated in FIG. 4 is that the surface processor 442 and/or the downhole processor 493 are configured to perform certain methods (discussed below) that are not in prior art.

Aspects of the present disclosure include making radiation measurements. Optionally, neutron source 318 may be turned on to expose at least part of the earth formation 495 to neutron radiation. The earth formation may interact with the neutron radiation. Radiation from the earth formation 495, from the interaction or occurring naturally, may result in nuclear radiation from the earth formation 495 impinging upon the detector. Detection occurs when radiation incident on a detector results in nuclear radiation information in the form of signals in response to detected nuclear radiation, conventionally in the form of scintillation which is converted to electronic signals. Herein, "information" may include raw data, processed data, analog signals, and digital signals. The radiation may be from the formation or from a calibration source.

Figure 5:
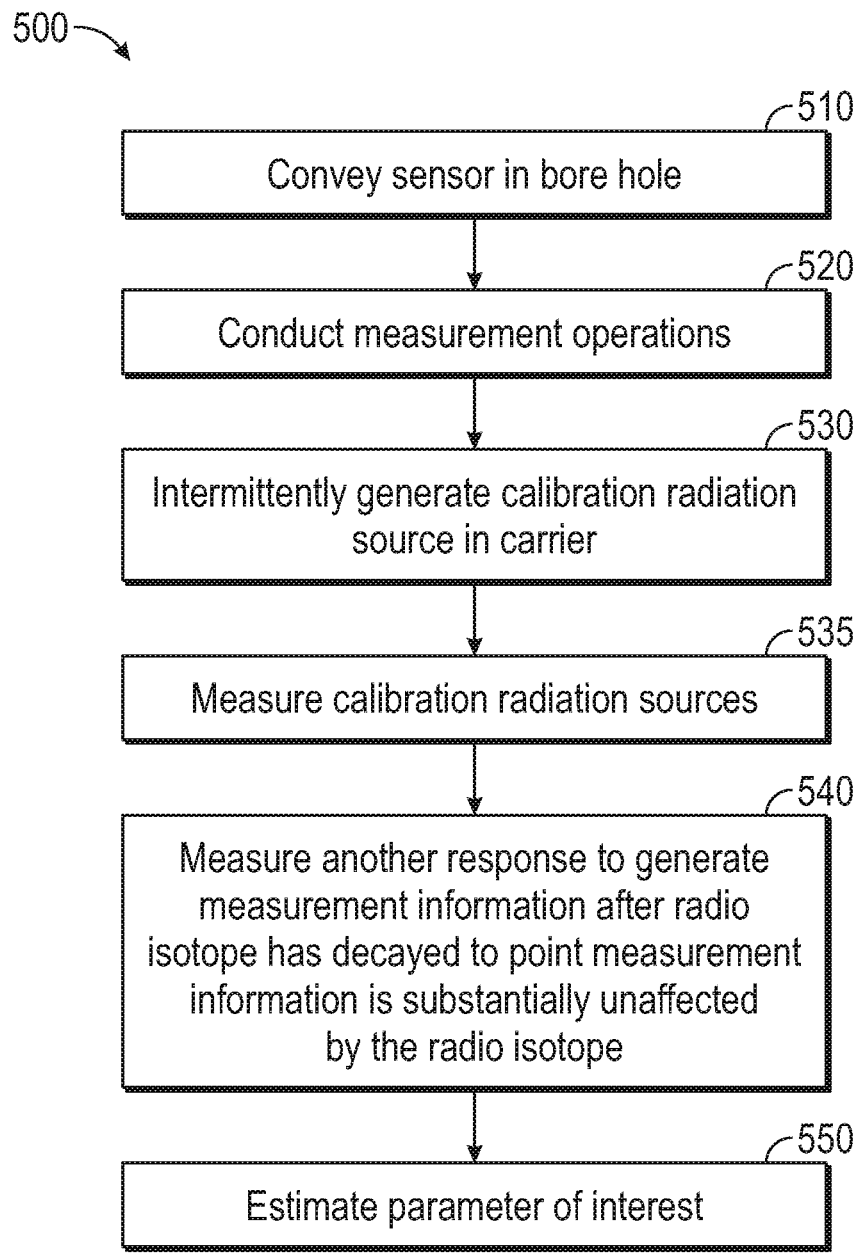
FIG. 5 shows a flow chart illustrating methods 500 in accordance with embodiments of the present disclosure for calibrating radiation information.

FIG. 5 shows a flow chart illustrating methods 500 in accordance with embodiments of the present disclosure for calibrating radiation information. Optional step 510 comprises using a carrier to convey a radiation sensor in a borehole. The sensor may be a spectral gamma ray detector. Optional step 520 comprises conducting measurement operations in the borehole by processing a response from the radiation sensor with measurement circuitry (before an exposure to a calibration source) to produce measurement information.

Step 530 comprises intermittently generating a calibration radiation source in the carrier, the calibration radiation source comprising a radioisotope producing radiation to which the radiation sensor is exposed. The calibration radiation source comprises a radioisotope producing radiation to which the radiation sensor is exposed. Step 530 may be carried out using at least one of: i) a pulsed laser; and ii) a plasma focus device. Step 535 may comprise measuring a calibration response from the radiation sensor with measurement circuitry during the exposure to produce calibration information, and conducting calibration operations by processing a calibration response from the radiation sensor with the measurement circuitry during the exposure to produce calibration information. This may be carried out while measurement operations (e.g., well logging data acquisition, as opposed to calibration operations) using the radiation sensor are suspended. Producing the radiation used in calibration may include producing gamma rays via the annihilation of positrons emitted from the radioisotope. Step 535 may include using a combined peak from simultaneously detected gamma rays as a calibration point.

Optional step 540 comprises measuring another response from the radiation sensor with the measurement circuitry to produce measurement information after the radioisotope has decayed to a reduced radiation level such that the measurement information is substantially unaffected by the radioisotope. Step 540 may include conducting measurement operations by processing the other response from the radiation sensor with the measurement circuitry after the exposure to produce calibrated measurement information in dependence upon the calibration information.

Optional step 550 comprises using the calibrated measurement information to estimate the parameter of interest. In the case of natural gamma ray spectroscopy, for example, since a gamma ray count may include gamma rays from multiple elements, the gamma ray count information may be separated, using a model, into gamma ray components associated with each element. In some embodiments, the model may include, but is not limited to, one or more of: (i) a mathematical equation, (ii) an algorithm, (iii) an energy spectrum deconvolution technique, (iv) a stripping technique, (v) an energy spectrum window technique, (vi) a time spectrum deconvolution technique, and (vii) a time spectrum window technique. The gamma ray component for at least one nuclide may be used to estimate at least one parameter of interest of the earth formation. The at least one parameter of interest may include, but is not limited to, one or more of: (i) density, (ii) porosity, and (iii) fluid saturation. A description for some embodiments estimating the at least one parameter of interest follows below.

Methods of the present disclosure may include determining the concentration in the system (e.g., the formation and borehole fluid) of significant nuclides such as, for example, oxygen and carbon. This may be carried out using a neutron induced gamma ray mineralogy measurement obtained along with the density measurement system. The same can also be achieved by measuring sourceless density and using an existing mineralogy log from a previous logging run. In both cases, it is possible to estimate a total oxygen concentration and a total carbon concentration in the system. Since the oxygen and carbon amount is linearly correlated with the gamma ray source to be used for density measurements, the oxygen, carbon and any other relevant element concentration measurement may be used to normalize the gamma ray source. The methods herein may occur in real-time using a tool that has both density and neutron induced gamma mineralogy systems on board. Alternatively, a sourceless density log may be processed subsequent to the logging run with mineralogy data sufficient to estimate oxygen content, carbon content, and/or any other relevant element content for normalizing the gamma ray source. Either embodiment enables removal of all other variables from the measurement except the formation density.

In one example, models may relate the natural gamma ray energy spectrum to elemental concentrations of potassium-40, and the uranium and thorium series (collectively, 'KUTh concentrations') in a volume. This spectrum is a linear combination of spectra from all three components, which may be represented as $$Y(E)=aK(E)+bU(E)+cTh(E)$$

where a, b and c are usually known as the yields and K(E), U(E) and Th(E) are energy spectra to K-40 radioisotope, uranium and thorium series. Y(E) is the total spectrum recorded by the detector. The yields a, b, c can be determined by various methods. One method involves the use of individual K, U, and Th elemental spectra and determine the yields using an algorithm that minimizes the error. Another method is to integrate certain segments of Y(E) and use those values as representatives of K-40, U and Th. With yields determined, they may be correlated to the elemental concentrations of K-40, uranium and thorium in the formation. Other naturally radioactive or activated elements may also be similarly identified. Models may further relate elemental concentrations to the location and extent of hydrocarbons in the formation.

In other examples, density of the formation may be estimated by applying one or more count rates from a detector to a model. Information collected by the detector(s) may be used to generate radiation information and derivative information. The estimation of formation density may also include comparison or combination of the radiation information with reference information. Reference information may be combined with radiation information to estimate density of the formation.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

Referring again to FIG. 3, certain embodiments of the present disclosure may be implemented with a hardware environment that includes an information processor 301, an information storage medium 303, an input device 307, processor memory 309, and may include peripheral information storage medium 305. The hardware environment may be in the well, at the rig, or at a remote location. Moreover, the several components of the hardware environment may be distributed among those locations. The input device 307 may be any data reader or user input device, such as data card reader, keyboard, USB port, etc. The information storage medium 303 stores information provided by the detectors. Information storage medium 303 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 303 stores a program that when executed causes information processor 301 to execute the disclosed method. Information storage medium 303 may also store the formation information provided by the user, or the formation information may be stored in a peripheral information storage medium 305, which may be any standard computer information storage device, such as a USB drive, memory stick, hard disk, removable RAM, or other commonly used memory storage system known to one of ordinary skill in the art including Internet based storage. Information processor 301 may be any form of computer or mathematical processing hardware, including commercially available processors and Internet-based hardware. When the program is loaded from information storage medium 303 into processor memory 309 (e.g. computer RAM), the program, when executed, causes information processor 301 to retrieve radiation information from either information storage medium 303 or peripheral information storage medium 305 and process the information to estimate a parameter of interest. Information processor 301 may be located on the surface or downhole.

"Radiation responsive" is defined as the characteristic of producing a detectable emission in response to absorbing radiation such that the absorbed radiation is quantifiable according to the emissions. For one class of radiation responsive materials, these emissions are photons produced by scintillation. In scintillation, light is emitted as a result of the absorption of radiation, such as, for example, a neutron, a gamma ray, etc.

Substantially unaffected by the radioisotope may be defined as exposure below 10 percent, 5 percent, 2 percent, 1 percent, 0.5 percent, 0.2 percent, 0.1 percent, or less of the maximum, minimum, or average radiation exposure value during exposure for calibration.

By stationary it is meant that the device does not move with respect to the surrounding wellbore/earth formation. "Redundant" information may refer to information pertaining to an adjacent segment of the formation for which radiation information has been obtained immediately prior to the acquisition of the redundant information. For example, sensor information acquired throughout a stationary period of the sensor (without modification of the sensor) will be redundant to information acquired at the beginning of the stationary period.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

I claim:

1. A method for estimating a parameter of interest of a formation intersected by a borehole using a radiation sensor disposed on a carrier in the borehole, comprising:
   intermittently generating a calibration radiation source in the carrier, the calibration radiation source comprising a radioisotope producing radiation to which the radiation sensor is exposed;
   measuring a calibration response from the radiation sensor with measurement circuitry during the exposure to produce calibration information; and
   measuring another response from the radiation sensor with the measurement circuitry to produce measurement information after the radioisotope has decayed to a reduced radiation level such that the measurement information is substantially unaffected by the radioisotope.

2. The method of claim 1, further comprising intermittently generating the calibration radiation source in the carrier while measurement operations using the radiation sensor are suspended.

3. The method of claim 1, wherein the radioisotope is a positron emitter producing radiation by annihilation of the positrons emitted from the radioisotope.

4. The method of claim 3, wherein gamma rays produced by the annihilation of positrons emitted from the radioisotope are used for calibration.

5. The method of claim 4, comprising using a combined peak from simultaneously detected gamma rays as a calibration point.

6. The method of claim 1, further comprising using the measurement information to estimate the parameter of interest.

7. The method of claim 1, wherein the generating the calibration radiation source occurs at predetermined intervals.

8. The method of claim 1, wherein the radiation sensor is a spectral gamma ray detector.

9. The method of claim 1, comprising generating the calibration radiation source using at least one of: i) a pulsed laser; and ii) a plasma focus device.

10. The method of claim 9, comprising:
generating the calibration radiation source within the sensor.

11. The method of claim 1, comprising:
applying a current to a capacitor bank over a first time interval while making a measurement using a response from the radiation sensor;
discharging the capacitor bank to a plasma focus device to generate the calibration radiation source;
generating a calibration response using measurements from the radiation sensor while the radioisotope is within a window of calibration emissions sufficient for calibration; and
allowing the radio isotope to decay to a reduced radiation level such that a radiation measurement is substantially unaffected by the radioisotope by ceasing activation of the plasma focus device and waiting for a second time interval before repeating the measurement cycle.

12. An apparatus for estimating a parameter of interest of a formation intersecting a borehole, comprising:
a radiation sensor;
a carrier configured to convey the radiation sensor into the borehole; and
a source generator configured to intermittently generate a calibration radiation source in the carrier, the calibration radiation source comprising a radioisotope producing radiation to which the radiation sensor is exposed, wherein the radioisotope is a positron emitter producing radiation by annihilation of the positrons emitted from the radioisotope.

13. The apparatus of claim 12, comprising measurement circuitry configured to:
conduct measurement operations in the borehole by processing a response from the radiation sensor before the exposure to produce measurement information;
conduct calibration operations by processing a calibration response from the radiation sensor during the exposure to produce calibration information; and
conduct measurement operations by processing another response from the radiation sensor after the exposure to produce calibrated measurement information in dependence upon the calibration information.

14. A method for estimating a parameter of interest of a formation intersected by a borehole using a radiation sensor disposed on a carrier in the borehole, comprising: intermittently generating a calibration radiation source in the carrier, the calibration radiation source comprising a radioisotope producing radiation to which the radiation sensor is exposed, wherein the radioisotope is a positron emitter producing radiation by annihilation of the positrons emitted from the radioisotope.

15. A method for estimating a parameter of interest of a formation intersected by a borehole using a radiation sensor disposed on a carrier in the borehole, comprising: intermittently generating a calibration radiation source in the carrier using at least one of: i) a pulsed laser; and ii) a plasma focus device, the calibration radiation source comprising a radioisotope producing radiation to which the radiation sensor is exposed.

16. A method for estimating a parameter of interest of a formation intersected by a borehole using a radiation sensor disposed on a carrier in the borehole, comprising: intermittently generating a calibration radiation source in the carrier, the calibration radiation source comprising a radioisotope producing radiation to which the radiation sensor is exposed, by:
applying a current to a capacitor bank over a first time interval while making a measurement using a response from the radiation sensor;
discharging the capacitor bank to a plasma focus device to generate the calibration radiation source;
generating a calibration response using measurements from the radiation sensor while the radioisotope is within a window of calibration emissions sufficient for calibration; and
allowing the radio isotope to decay to a reduced radiation level such that a radiation measurement is substantially unaffected by the radioisotope by ceasing activation of the plasma focus device and waiting for a second time interval before repeating the measurement cycle.

* * * * *